United States Patent [19]

Frankot

[11] Patent Number: 5,726,656
[45] Date of Patent: Mar. 10, 1998

[54] ATMOSPHERIC CORRECTION METHOD FOR INTERFEROMETRIC SYNTHETIC ARRAY RADAR SYSTEMS OPERATING AT LONG RANGE

[75] Inventor: Robert T. Frankot, Tucson, Ariz.

[73] Assignee: Hughes Electronics, Los Angeles, Calif.

[21] Appl. No.: 769,568

[22] Filed: Dec. 19, 1996

[51] Int. Cl.$^6$ ................................................. G01S 13/90
[52] U.S. Cl. .............................. 342/25; 342/26; 342/156; 342/174; 342/194
[58] Field of Search .......................... 342/25, 26, 156, 342/174, 195, 196, 194, 203

[56] References Cited

U.S. PATENT DOCUMENTS

| | | | |
|---|---|---|---|
| 5,260,708 | 11/1993 | Auterman | 342/25 |
| 5,424,743 | 6/1995 | Ghiglia et al. | 342/25 |
| 5,463,397 | 10/1995 | Frankot | 342/25 |
| 5,608,405 | 3/1997 | Pritt | 342/25 |
| 5,659,318 | 8/1997 | Madsen et al. | 342/25 |

*Primary Examiner*—John B. Sotomayor
*Attorney, Agent, or Firm*—Leonard A. Alkov; Wanda K. Denson-Low

[57] ABSTRACT

A method of computing and correcting phase errors due to atmospheric turbulence in a dual-antenna multiple-pass synthetic array radar (SAR) interferometer system. The method improves topographic mapping accuracy at very long ranges. The method computes an atmospheric correction from the residual phase difference between a two-pass interferometer output (containing atmospheric phase errors) and a dual-antenna single-pass interferometer output (for which atmospheric phase errors cancel because the two channels are collected simultaneously). The residual phase measured in a single resolution element is then filtered by averaging over an area of many resolution elements, typically on the order of several thousand resolution elements. This exploits the long correlation distance of the atmospheric phase errors to reconstruct the dominant low-frequency part of the error spectrum. In addition, unwrapping the phase of the output of the complex Wiener filter produces an atmospheric turbulence measurement map.

5 Claims, 2 Drawing Sheets

ATMOSPHERIC CORRECTION METHOD FOR INTERFEROMETRIC SYNTHETIC ARRAY RADAR SYSTEMS OPERATING AT LONG RANGE

BACKGROUND OF THE INVENTION

The present invention relates generally to synthetic array radar (SAR) interferometers, and the like, and more particularly, to a method of computing and correcting phase errors due to atmospheric turbulence in a dual-antenna multiple-pass synthetic array radar interferometer.

The present invention is an improvement to the invention disclosed in U.S. Pat. No. 5,463,397 entitled "Hyper-Precision SAR Interferometry Using a Dual-Antenna Multi-Pass System", issued Oct. 31, 1995, and assigned to the assignee of the present invention. The contents of U.S. Pat. No. 5,463,397 are incorporated herein by reference in its entirety.

The invention of U.S. Pat. No. 5,463,397 provides for a dual-channel SAR interferometer that operates in a multiple-pass mode to achieve accuracy unobtainable by either operating in dual-channel or multiple-pass modes alone. The invention of U.S. Pat. No. 5,463,397 suffers, as does conventional multiple-pass interferometry, from accuracy limitations at very long ranges because of atmospheric inhomogeneities that change significantly in the time frame between the multiple passes. These inhomogeneities can result in rms phase errors on the order of radians but with correlation distances on the order of kilometers.

Other prior art includes traditional surveying methods, such as on the ground surveying with chain and transit, stereoscopic aerial photography, and stereoscopic SAR imaging, laser geodometers, and single-pass, dual-channel interferometric synthetic array radar (IFSAR) and dual-pass single-channel IFSAR.

In a single pass, dual channel IFSAR system, one aircraft (or spacecraft) with two antennas collects SAR data from two antennas. This is discussed in an article by L. C. Graham, entitled "Synthetic Interferometer Radar for Topographic Mapping", Proc. IEEE, Vol. 64, pp. 763-768, June 1974. While the single pass system is convenient it is often limited in sensitivity, especially at long ranges, due to the small difference in the grazing angles for each channel. The sensitivity can be increased by increasing the elevation separation of the antennas. However, with increased sensitivity comes increased ambiguity. There are several approaches to coping with the ambiguities based on assumptions about terrain smoothness.

In a dual pass, single channel IFSAR system, two passes are used to collect two SAR images. The grazing angle difference is under the control of the radar operators but with increased sensitivity comes increased ambiguity far beyond that of the single-pass dual-channel approach. The accuracy of this technique suffers because of phase errors due to time-varying atmospheric inhomogeneities. These atmospheric effects cancel for a single-pass system because the two channels are collected simultaneously.

Accordingly, it is an objective of the present invention to provide for a method of that improves upon the invention disclosed in U.S. Pat. No. 5,463,397. It is a further objective of the present invention to provide for a method of computing and correcting phase errors due to atmospheric turbulence in a dual-antenna multiple-pass synthetic array radar interferometer.

SUMMARY OF THE INVENTION

To meet the above and other objectives, the present invention provides for a method of computing and correcting phase errors due to atmospheric turbulence in a dual-antenna multiple-pass synthetic array radar (SAR) interferometer system. The present method improves topographic mapping accuracy at very long ranges. The method computes an atmospheric correction from the residual phase difference between a two-pass interferometer output (containing atmospheric phase errors) and a dual-antenna single-pass interferometer output (for which atmospheric phase errors cancel because the two channels are collected simultaneously). The residual phase measured in a single resolution element is then faltered by averaging over an area of many resolution elements, typically on the order of several thousand resolution elements. This exploits the long correlation distance of the atmospheric phase errors to reconstruct the dominant low-frequency part of the error spectrum.

The atmospheric correction method may be efficiently implemented by modifying the dual-antenna multiple-pass SAR interferometer of U.S. Pat. No. 5,463,397, by inserting an additional filter in the residual phase calculation. In essence, the overall structure of the present invention is substantially the same as that of the SAR interferometer of U.S. Pat. No. 5,463,397, with an added filter in the "fine elevation processing" segment.

The atmospheric correction method thus provides for an augmentation to the SAR interferometer disclosed in U.S. Pat. No. 5,463,397 which improves its accuracy. The inputs are the same as used in this prior SAR interferometer and include two complex valued SAR images from each of two or more passes of a sensor over a target area, where each pass is separated in elevation according to a designed synthetic elevation aperture. The atmospheric correction method calculates object height from a set of SAR images collected from a common azimuth. The output is a precision terrain elevation map and coregistered SAR image.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
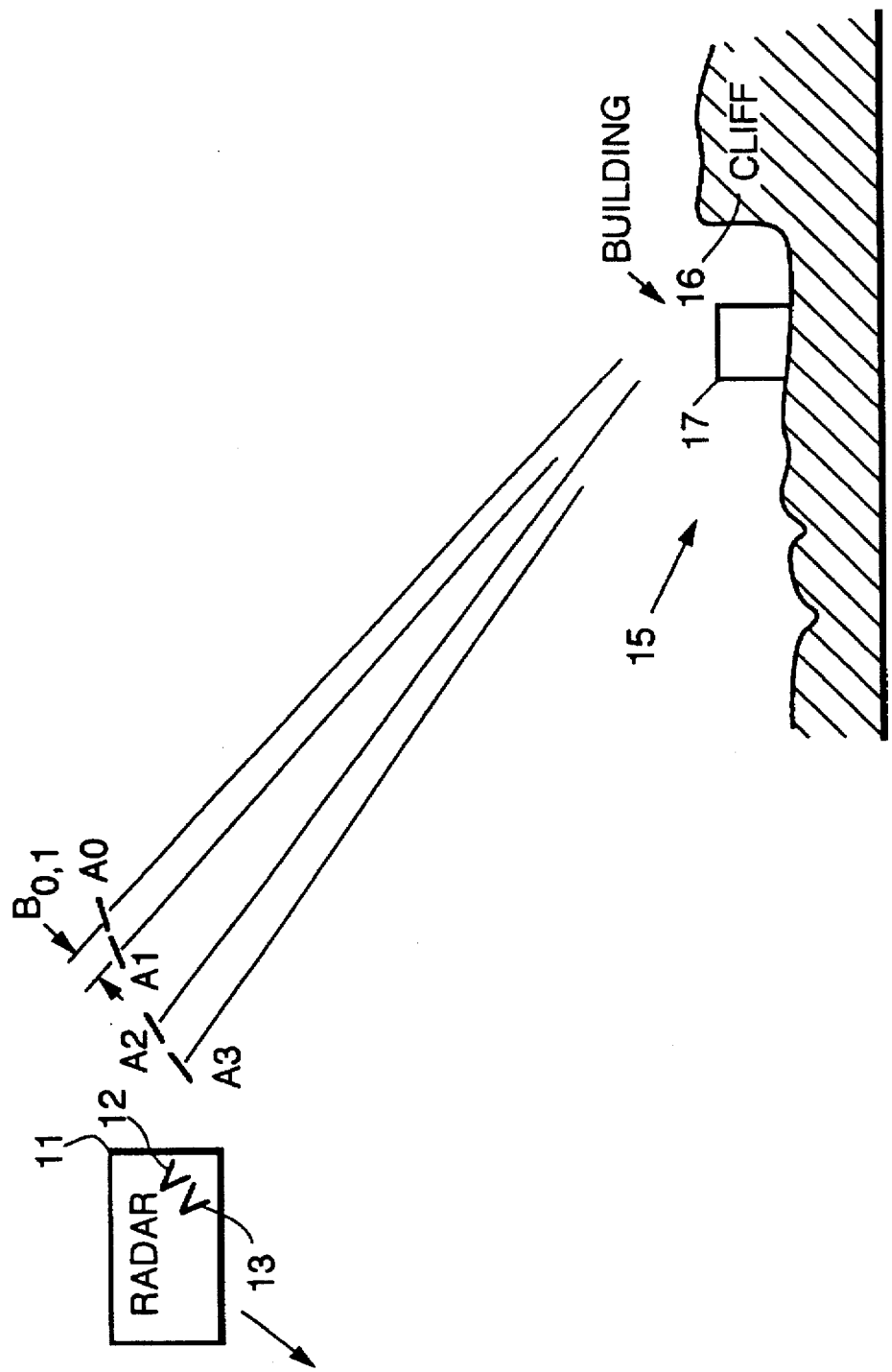
FIG. 1 shows an operational scenario using a dual-antenna multiple-pass synthetic array radar interferometer system and method in accordance with the principles of the present invention.

Referring to the drawing figures, FIG. 1 shows an operational scenario using a dual-antenna multiple-pass synthetic array radar interferometer system 10 that implements a processing method 20 (FIG. 2) in accordance with the principles of the present invention. The interferometer system 10 comprises a dual-antenna interferometric SAR system 11. The dual-antenna interferometric SAR system 11 is comprised of a SAR radar having two antennas 12, 13 spaced apart by a predetermined fixed distance. The two antennas 12, 13 are used to take successive SAR maps of an image scene 15, identified as images $A_0$ and $A_1$, $A_2$ and $A_3$, $A_4$ and $A_5$, respectively. Images $A_0$ and $A_1$ are generated on pass 1, images $A_2$ and $A_3$ are generated on pass 2, . . . and images $A_{2k-2}$ and $A_{2k-1}$ are generated on pass k. The image scene 15 is shown having a cliff 16 and a building 17, for example.

Figure 2:
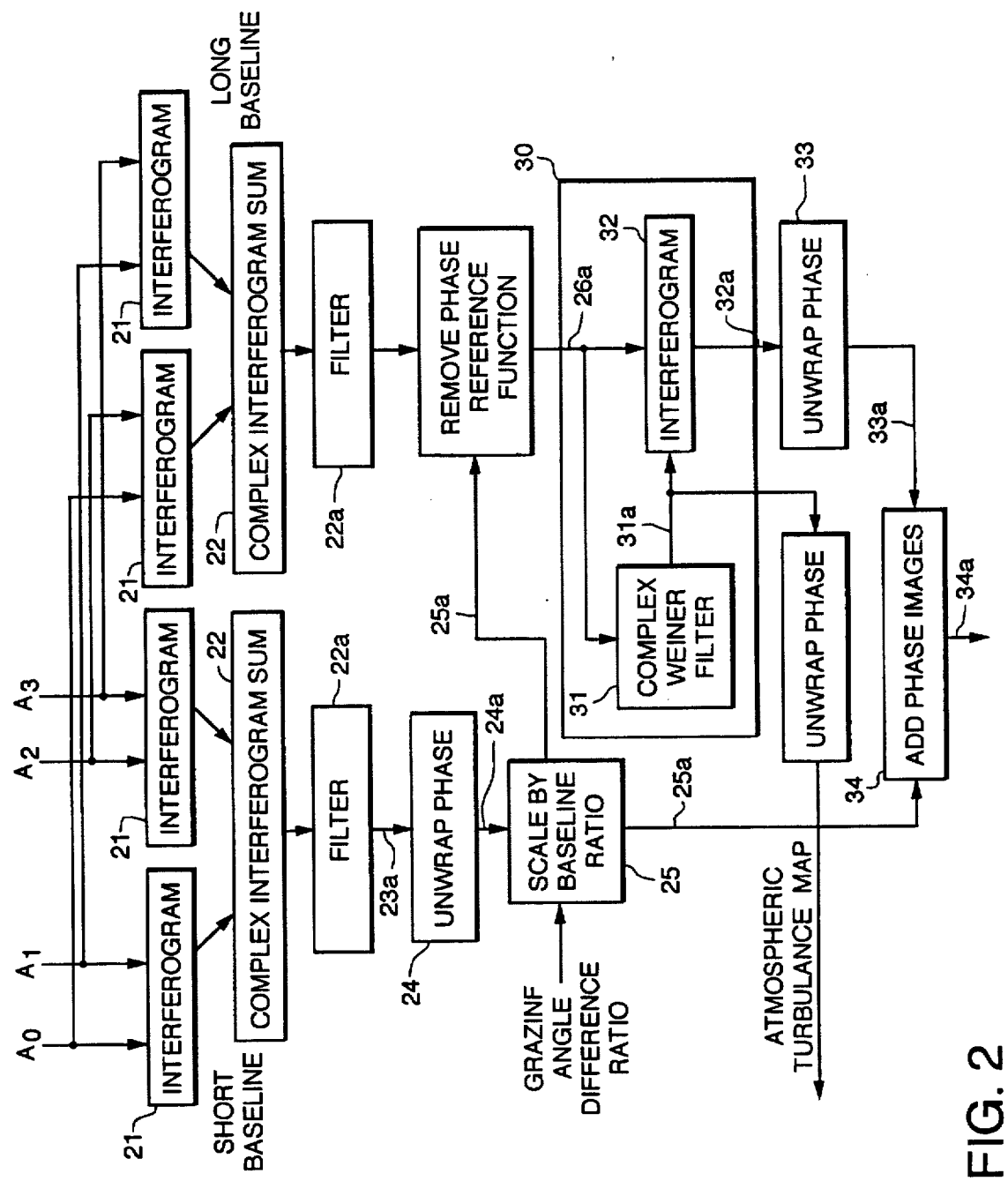
FIG. 2 illustrates a method in accordance with the principles of the present invention of computing and correcting phase errors due to atmospheric turbulence in the dual-antenna multiple-pass synthetic array radar interferometer system of FIG. 1.

FIG. 2 illustrates details of the present method 20 of computing and correcting phase errors due to atmospheric turbulence in the dual-antenna multiple-pass synthetic array radar (SAR) interferometer system 10 shown in FIG. 1. The method 20 is an augmentation of the fine elevation processing method employed in the interferometer system 10 of U.S. Pat. No. 5,463,397, wherein a filter is added to the fine elevation processing portion of the method used in that system 10.

The processing method of U.S. Pat. No. 5,463,397 processes complex image-pairs derived from the dual-antenna interferometer system 10. The processing method has four main processing steps including relative calibration processing, coarse elevation processing, fine elevation processing, and volume imaging.

The relative calibration processing includes dual-antenna, low frequency phase error processing to remove low frequency phase inconsistencies between dual-channel (same-pass) image pairs, inter-pass, low frequency processing to remove low frequency phase inconsistencies between inter-pass image pairs, and inter-pass baseline processing to estimate the elevation angle separation between each pass.

The coarse elevation processing includes noise processing that adds data from the dual-antenna interferometer to reduce the effects of noise, and spatial phase unwrapping to resolve minor ambiguities in the coarse elevation estimate. The output of the coarse elevation processing provides an elevation map.

The fine elevation processing includes inter-pass residual phase processing to compute the phase update attributable to each pass of the interferometer, average scaled residual processing to combine these multiple phase updates with the proper relative scaling into a single accurate elevation update, update processing to update the elevation map provided by the coarse elevation processing, and optional iteration processing of the updated elevation map to provide greater accuracy under adverse conditions. The output of the fine elevation processing provides an enhanced elevation map.

The coarse elevation estimate is used to initialize the fine elevation estimation processing. The fine elevation processing produces fine elevation estimates. Interferograms are calculated for complex images pairs. The interferograms are then added. The phase reference function is removed using the coarse elevation map that is scaled by the baseline ratio. This produces an interferogram having residual phase. Phase unwrapping of the interferogram is then performed. The phase unwrapped image then scaled by the baseline ratio. The scaled interferogram is then averaged over all passes. The elevation is then updated to produce a fine elevation map.

With the above in mind, the method 20 of the present invention collects images with two antennas 12, 13 repeatedly from various grazing angles (interferometric "baselines"). This collection approach and associated processing preserves the high sensitivity of the long-baseline available from dual-pass IFSAR while resolving the ambiguity problem in a mathematically optimum manner. Thus, this collection approach has an accuracy that exceeds the high local accuracy of long-baseline interferometry and at the same time meets or exceeds the ambiguity performance of short-baseline interferometry. Accuracy and ambiguity resolution are improved with each additional pass/channel.

However, long baseline interferometry is much more vulnerable to low frequency errors that are dependent upon atmospheric conditions due to changes in the atmosphere during the time between passes. These particular errors do not degrade the short baseline interferometry data because any given short baseline pair is collected simultaneously. A simple complementary filter might be sufficient if ambiguity resolution were not an issue. Instead, a "tightly coupled" filter arrangement 30 has been devised that is used in the present invention.

The use of the "tightly coupled" filter arrangement 30 exploits redundancy between the various pairings of images beyond that required for ambiguity resolution. Time variant atmospheric effects can be recovered by comparing differences between four images ($A_0$, $A_1$, $A_2$, $A_3$), where the pair ($A_0$, $A_1$) are collected simultaneously, the pair ($A_2$, $A_3$) are collected simultaneously, but the two pairs are taken at different times. These images are generated using two passes of the system 10 disclosed in U.S. Pat. No. 5,463,397.

The physical basis for the present atmospheric correction method 20 is as follows. A simplified model for the phase of images $A_0$–$A_3$ in a particular range/azimuth cell is $$\phi_0 = a_0 z + \phi_{atm0}, \qquad (1)$$

$$\phi_1 = a_1 z + \phi_{atm1}, \qquad (2)$$

$$\phi_2 = a_2 z + \phi_{atm2}, \qquad (3)$$

$$\phi_3 = a_3 z + \phi_{atm3}, \qquad (4)$$

respectively, where $a_n$ is a constant whose value depends on the grazing angle, z in the terrain elevation, and $\phi_{atmn}$ is the phase contribution due to temporal variations in atmospheric propagation. Images 0 and 1 are collected simultaneously and from almost the same position as are images 2 and 3. Therefore, $$\phi_{atm0} = \phi_{atm1} \qquad (5)$$

and $$\phi_{atm2} = \phi_{atm3}. \qquad (6)$$

Comparing phases and rearranging gives $$\phi_0 - \phi_1 = (a_0 - a_1)z$$

$$\phi_2 - \phi_3 = (a_2 - a_3)z$$

$$\phi_0 - \phi_2 = (a_0 - a_2)z + \phi_{atm0} - \phi_{atm2}$$

$$\phi_1 - \phi_3 = (a_1 - a_3)z + \phi_{atm1} - \phi_{atm3} \qquad (7)$$

The atmospheric contribution to the phase error $$\Delta\phi_0 = \phi_{atm0} - \phi_{atm2} = \phi_{atm1} - \phi_{atm3}$$

is then the combination of a minimum of three interferometric phase images $$\Delta\phi = (\phi_0 - \phi_2) - \frac{a_0 - a_2}{a_0 - a_1}(\phi_0 - \phi_1) \qquad (8)$$

or a combination of four images $$2\hat{\Delta\phi} = (\phi_0 - \phi_2) + (\phi_1 - \phi_3) - \frac{a_0 - a_2}{a_0 - a_1}(\phi_0 - \phi_2) - \frac{a_0 - a_2}{a_0 - a_1}(\phi_2 - \phi_3). \quad (9)$$

The generalization to n passes is direct and only requires that this operation be applied to pairs of passes.

The expression above is for illustrative purposes only. It does not provide sufficient accuracy in practice due to wideband phase noise and ambiguities amplified by the baseline ratio $(a_0-a_2)/(a_0-a_1)$. In practice, the phrase terms above are obtained by low-pass filtering of complex interferograms as shown in the drawing figure.

FIG. 2 shows an expanded block diagram of the fine elevation processing disclosed with reference to FIG. 5 of U.S. Pat. No. 5,463,397 for two-pass image collection. For more than two passes, the steps of the method 20 are repeated and the update to the elevation map is accumulated with each additional pass.

With specific reference m FIG. 2, each interferogram 21 is a pixel-by-pixel conjugate product 22 of two pairs of images $A_0$, $A_1$, and $A_2$, $A_3$ followed by an optional standard filtering step 22a resulting in a single complex image output. The first pair of interferograms have a short baseline, while the second pair of interferograms have a long baseline.

Two summed complex images are formed wherein a pixel-by-pixel complex sum of two images resets in a single complex image output. A first complex interferogram sum 23a is generated for the two short baseline complex interferogram outputs, while a second complex interferogram sum 23b is generated for the two long baseline complex interferogram outputs.

The first complex interferogram sum 23a is processed to unwrap its phase 24, wherein the phase of each complex pixel is computed and the absolute phase is reconstructed, up to a single additive constant. This produces an unwrapped phase image 24a. There are many well-known varients suitable for implementing this function.

The unwrapped phase image 24a is then scaled 25 by the baseline ratio. The first input of this processing step is the unwrapped phase image 24a (real-valued), and the second input is a scalar value given by the ratio of the grazing angle differences between the two-pass pairing of images, $(A_0, A_2)$, and that of the same-pass pairing, $(A_0, A_1)$.

The second complex interferogram sum 23b is processed to remove the phase reference from the image. The remove phase reference processing function 26 has two input images, namely, a complex interferogram corresponding to the second complex interferogram sum 23b and a real-valued (scaled) reference phase image 25a provided by the baseline ratio scaling function 25. The output of the phase reference removal function 26 is a complex image 26a or complex interferogram 26a whose phase is that of the second complex interferogram sum 23b minus the reference phase image 25a.

The atmospheric correction processing 30 provided by the present invention is implemented on the complex image 26a output by the phase reference removal function 26. The atmospheric correction processing 30 includes a complex Wiener filter 31 in conjunction with a second phase reference removal function 32.

The complex Wiener filter 31 has an input that is a complex interferogram 26a, or complex image sum 26a, and its output is a low-pass filtered complex interferogram 31a. The filter characteristic is determined from power spectral density models for the "signal" given by the atmospheric turbulence effect in this case, and the noise, which corresponds to the broadband noise in the two-pass interferograms (images $A_0$, $A_2$) with additional phase noise due to scaled phase error from the single-pass interferograms (images $A_0$, $A_1$). The Wiener filter 31, given models for signal and noise spectra, is well-known. The power spectrum of the atmospheric turbulence effect is highly dependent on meteorological conditions.

The Wiener filter 31 may be obtained either as a fixed design based on average radar measurements of turbulence spectra or by fitting a spectral model to the two-pass interferograms $(A_0, A_2)$ after subtracting the phase of the single-pass interferograms. Information regarding the effects of imaging through atmospheric turbulence can be found in an article by R. L. Fante, entitled "Turbulence-Induced Distortion of Synthetic Aperture Radar Images", *IEEE Trans. Geoscience and Remote Sensing*, Vol. 32, pp. 958–960, July 1994 and a book by J. W. Goodman, entitled *Statistical optics, NY:* John Wiley & Sons, 1985, and citations therein.

The complex image output by the prior remove phase reference function 26 is processed by the second phase reference removal function 32 in the filter arrangement 30, whose second input is the output of the complex Wiener filter 31. The second complex image sum 26a, or complex interferogram 26a, is processed to remove the of the Wiener-filtered complex interferogram from the image. The output of the second phase reference removal function 32 is a complex image 32a whose phase is that of the complex image 26a or interferogram 26a produced by the first phase reference removal function 26 minus the phase of the Wiener-filtered complex interferogram 31a output by the complex Wiener filter 31.

The atmospherically corrected complex image is processed to unwrap its phase 33, wherein the phase of each complex pixel is computed and the absolute phase is reconstructed, up to a single additive constant. This produces a real-valued atmospherically corrected image 33a having unwrapped phase.

The real-valued atmospherically corrected image 33a and the real-valued reference phase image 25a provided by the baseline ratio scaling function 25 are added 34. The output of this step is an image 34a that is the sum of the two input images and which is proportional to terrain elevation.

An added benefit of the present invention is that an atmospheric turbulence measurement map may be generated using the output 31 a of the complex Wiener filter 31. Processing the output 31a of the complex Wiener filter 31 to unwrap the phase 35 of the output 31a of the complex Wiener filter 31 produces the atmospheric turbulence measurement map.

Terrain height data by itself has all the uses associated with maps and charts. Height data in precise registration with radar data (as produced by the present invention) has several unique advantages. The present processing method 20 may be used to support mission rehearsal in a highly detailed virtual battlefield, aid image fusion (e.g. radar with infrared and visible) through ortho-rectification, improve weapon delivery accuracy, accurately measure the height of navigation hazards such as towers, aid in providing 3-D site models for treaty verification and strategic intelligence applications, and aid in detecting camouflaged or concealed targets. The present method 20 provides the potential to improve radar image accuracy (linearly and possibly exponentially) in accordance with the number of repeat-passes, as opposed to conventional noncoherent averaging techniques where accuracy improves in proportion to the square root of the number of passes.

The present method 20 may be used for long range standoff reconnaissance. A SAR vehicle (manned or unmanned) may be operated to a produce number of SAR images at different grazing angles. The present method 20 may be used with SAR-equipped unmanned aerial vehicles, and potential spaceborne reconnaissance systems. In this regime the present method 20 provides precision battlefield maps and other intelligence data on-demand for contingency operations.

The present method 20 may be used for global topographic mapping. NASA/JPL has proposed a number of global topographic mapping systems, one of which is discussed in an article by E. Im, entitled "Altimeter Systems for High-Resolution Land and Ice Topographic Mapping", *International Geoscience and Remote Sensing Symposium*, University of Maryland, College Park, Md., pp. 823–826, May 1990. The present method 20 would extend the utility of such a system.

The present method 20 may also be used in disaster monitoring systems. Topographic mapping and terrain change/deformation measurements obtained through SAR interferometry have been identified by the U.S. Geological Survey (USGS) as potential tools for advanced warning and assessment of natural disasters such as earthquakes, volcanoes, landslides, and floods. The present method 20 may be used to improve the viability of such disaster monitoring systems.

Thus, a method of computing and correcting phase errors due to atmospheric turbulence using a dual-antenna multiple-pass synthetic array radar interferometer has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method for use with an interferometric synthetic aperture radar system having two antennas separated by a predetermined separation distance which generates data comprising complex image pairs representative of an image scene, and wherein the method computes and corrects phase errors due to atmospheric turbulence, said method comprising the steps of:

generating a first pair of images having a short baseline using the synthetic aperture radar system;

generating a second pair of images having a long baseline using the synthetic aperture radar system;

combining the respective first and second pairs of images to produce first and second summed complex interferograms;

processing the first complex interferogram sum to unwrap its phase, wherein the phase of each complex pixel is computed and the absolute phase is reconstructed, up to a single additive constant and to produce an unwrapped phase image;

processing the real-valued unwrapped phase image and a scalar value given by the ratio of the grazing angle differences between the long baseline images and that of the short baseline images to scale the unwrapped phase image by the baseline ratio;

processing the scaled reference phase image and the second complex interferogram sum to remove the phase reference from the second complex interferogram sum to produce a complex image whose phase is that of the second complex interferogram sum minus the reference phase image;

processing the complex image using a complex Wiener filter to produce a low-pass filtered complex interferogram;

processing the complex image and the low-pass filtered complex interferogram to remove the phase of the Wiener-filtered interferogram from the complex image and provide an atmospherically corrected complex image whose phase is the phase of the complex image minus the phase of the low-pass filtered complex image, which complex image;

processing the atmospherically corrected complex image to produce a real-valued atmospherically corrected image having unwrapped phase; and adding the real-valued atmospherically corrected image and the real-valued reference phase image provided by the baseline ratio scaling function to produce an image that is proportional to terrain elevation.

2. The method of claim 1 wherein the complex Wiener filter comprises a filter based on average radar measurements of atmospheric propagation spectra.

3. The method of claim 1 wherein the complex Wiener filter is created by fitting a spectral model to the long baseline interferogram after subtracting the phase of the short baseline interferograms.

4. The method of claim 1 further comprising the step of:

processing the low-pass filtered complex interferogram to unwrap its phase and produce an atmospheric turbulence measurement map.

5. A method for use with an interferometric synthetic aperture radar system having two antennas separated by a predetermined separation distance which generates data comprising complex image pairs representative of an image scene, and wherein the method computes and corrects phase errors due to atmospheric turbulence, said method comprising the steps of:

generating a first pair of images having a short baseline using the synthetic aperture radar system;

generating a second pair of images having a long baseline using the synthetic aperture radar system;

combining the respective first and second pairs of images to produce first and second summed complex interferograms;

processing the first complex interferogram sum to unwrap its phase, wherein the phase of each complex pixel is computed and the absolute phase is reconstructed, up to a single additive constant and to produce an unwrapped phase image;

processing the real-valued unwrapped phase image and a scalar value given by the ratio of the grazing angle differences between the long baseline images and that of the short baseline images to scale the unwrapped phase image by the baseline ratio;

processing the scaled reference phase image and the second complex interferogram sum to remove the phase reference from the second complex interferogram sum to produce a complex image whose phase is that of the second complex interferogram sum minus the reference phase image;

processing the complex image using a complex Wiener filter to produce a low-pass filtered complex interferogram; and processing the low-pass filtered complex interferogram to unwrap its phase and produce an atmospheric turbulence measurement map.

* * * * *